United States Patent [19]

Glaeser et al.

[11] Patent Number: 5,389,353
[45] Date of Patent: Feb. 14, 1995

[54] FLUIDIZED BED PROCESS FOR CHLORINATING TITANIUM-CONTAINING MATERIAL AND COKE USEFUL IN SUCH PROCESS

[75] Inventors: Hans H. Glaeser, Wilmington, Del.; Mark J. Spoon, Ponca City, Okla.

[73] Assignee: E. I. Du Pont de Nemours and Company, Wilmington, Del.

[21] Appl. No.: 189,469

[22] Filed: Feb. 1, 1994

Related U.S. Application Data

[63] Continuation of Ser. No. 944,998, Sep. 15, 1992, abandoned, which is a continuation of Ser. No. 739,771, Jul. 26, 1991, abandoned, which is a continuation of Ser. No. 618,520, Nov. 21, 1990, abandoned, which is a continuation of Ser. No. 373,604, Jun. 30, 1989, abandoned, which is a continuation of Ser. No. 119,468, Nov. 10, 1987, abandoned.

[51] Int. Cl.$^6$ .................... C01G 23/02; C01G 23/047
[52] U.S. Cl. ...................... 423/492; 423/74; 423/78; 423/79
[58] Field of Search ............ 423/74, 78, 79, 492

[56] References Cited

U.S. PATENT DOCUMENTS

| | | |
|---|---|---|
| 2,701,179 | 2/1955 | McKinney . |
| 3,495,936 | 2/1970 | Jones . |
| 3,848,051 | 11/1974 | Mas et al. .............. 423/492 |
| 3,883,636 | 5/1975 | cole et al. .............. 423/492 |
| 3,960,704 | 6/1976 | Kegler et al. . |
| 4,014,976 | 3/1977 | Adachi et al. . |
| 4,046,854 | 9/1977 | Dunderdale .......... 423/79 |
| 4,279,871 | 7/1981 | Bonsack ................. 423/78 |
| 4,310,495 | 1/1982 | Bonsack ................. 423/78 |
| 4,419,456 | 12/1983 | Audeh .................... 518/703 |
| 4,519,988 | 5/1985 | Fridman ................. 423/78 |
| 4,619,815 | 10/1986 | Robinson ................ 423/79 |

OTHER PUBLICATIONS

2207B. Metallurg. Transactions; vol. 10B. No. 2. (Jun. 1979); of the 1979 American Soc. for Metals and the Metallurgical Society of AIME.

Primary Examiner—George Fourson
Assistant Examiner—Ken Horton

[57] ABSTRACT

In a fluidized bed process for chlorinating rirnium-containing material, an improvement is disclosed comprising utilizing in the process calcined petroleum shot coke, calcined petroleum fluid coke or mixtures thereof. The improved process is capable of (a) decreasing the amount of fine particulate coke that is entrained in the hot gases exiting the fluidized bed reactor, and (b) more completely reacting the coke.

11 Claims, No Drawings

FLUIDIZED BED PROCESS FOR CHLORINATING TITANIUM-CONTAINING MATERIAL AND COKE USEFUL IN SUCH PROCESS

This is a continuation of application Ser. No. 07/944,998, filed Sep. 5, 1992, now abandoned, which is a continuation of application Ser. No. 07/739,771, filed Jul. 26, 1991, which is a continuation of application Ser. No. 07/618,520, filed Nov. 21, 1990, which is a continuation of application Ser. No. 07/373,604, filed Jun. 30, 1989, which is a continuation of application Ser. No. 07/119,468, filed Nov. 10, 1987, all now abandoned.

BACKGROUND OF THE INVENTION

This invention relates to an improved fluidized bed process for chlorinating titanium-containing material. The invention also relates to a spherical, calcined petroleum coke which can be used in such process.

In commercial fluidized bed processes for chlorinating titanium-containing material, particulate coke, particulate titanium-containing material, chlorine and optionally oxygen or air are fed into a reaction chamber, and a suitable reaction temperature and pressure are maintained. The flow rates of the particulate material, chlorine and chlorine/air or oxygen are adjusted so that the particulate material is maintained in a fluidized state, i.e., it is maintained in a state of suspension and has the appearance of boiling. Gaseous titanium tetrachloride, other metal chlorides, and carbon oxides are exhausted from the reactor chamber. The gaseous titanium tetrachloride so produced can then be separated from the other metal chlorides and used to produce titanium dioxide pigment or titanium metal.

A problem, however, which has not been satisfactorily solved in the foregoing fluidized bed process is that substantial quantities of particulate coke used in process becomes degraded by mechanical action and/or chemical action into fines of less than about 150 microns in size. Such fines generally become entrained in the hot exhaust gases. As a consequence, they have a short residence time in the reaction zone of the process and often exit the reactor in an unreacted state. While the fines can be recycled to the process, they still tend to exit before reacting and therefore generally must be removed from the process. The unreacted fines are therefore a disposal problem and waste of the reductant values in the coke.

SUMMARY OF THE INVENTION

The following summarizes this invention:

In a fluidized bed process for chlorinating titanium-containing material, the improvement comprising utilizing in the process a calcined, petroleum coke which has substantially spherical particles which are formed in situ during the coking process.

There is also provided by this invention spherical, calcined, petroleum shot coke which can be utilized in the foregoing process.

It has been found that the use of the improved process of this invention can substantially decrease the amount of fine particulate coke which is entrained in the hot exit gases exiting the fluidized bed process. Consequently, the coke becomes more completely reacted. The resulting greater coke utilization reduces coke costs and lessens disposal problems. Also, the spherical, calcined, petroleum coke useful in this invention often has higher bulk densities and packing densities which can permit greater chlorinator throughput because more of the coke can be loaded into a given chlorinator volume. Moreover, the spherical, calcined petroleum coke useful in this invention tends to have higher particle densities which can reduce the segregation of such coke and ore particles and thereby result in enhanced chlorination. In addition, the process of this invention can use coke which is made from high sulfur heavy crude oils. Such coke is typically less expensive and more abundant than sponge cokes which are ordinarily used in the process. And, it also has been found that use of the improved process of this invention can result in greater tolerance to CaO which often is present in the $TiO_2$ ore. Finally, compared to calcined sponge cokes which are ordinarily used in the chlorination process, other benefits of the coke utilized in this invention are that it generally (a) has a lower minimum fluidization velocity and (b) has a lower fines content which causes less dusting.

DETAILED DESCRIPTION OF THE INVENTION

Suitable fluidized bed processes for chlorinating titanium-containing ore are described, for example, in U.S. Pat. No. 2,701,179 and in the article by J. Glasser and W. L. Robinson entitled, "Fluidized Bed Chlorination of Rutile" which appeared in the Sep. 9, 1962 publication of the Society of Mining Engineers of AIME. Both such patent and article are hereby incorporated by reference.

Typical conditions for commercial fluidized bed processes for chlorinating titanium-containing material are as follows: reaction temperature of about 900°–1300° C., pressure of about 1.5–3 atmospheres, reactor size of about 6–25 feet in diameter with multiple chlorine jets in the base, reactor superficial velocity of about 0.5–1.5 feet per second, and a settled bed depth of about 6–25 feet. The titanium containing material used typically has a particle size of about 70–800 microns in diameter and the coke used typically has a particle size of about 300–5000 microns in diameter.

The titanium-containing material can be any suitable titanium-bearing source material such as rutile, ilmenite or anatase ore; beneficiates thereof; titanium-containing by-products or slags; and mixtures thereof.

The coke which is suitable for use in this invention is a calcined petroleum coke which has substantially spherical particles which are formed in situ during the coking process. Such coke can be produced by any process which produces a coke having the foregoing properties. Preferred are shot coke, fluid coke or mixtures thereof.

Suitable processes for making shot coke and fluid coke, as well as calcining process for such coke, are disclosed in *Petroleum Coke* by S.C. Spenser (Stanford Research Institute, Report 72, 1971), and *Petroleum Coke, Supplement B* by D. Greenway (Stanford Research Institute, Report 72B, 1985). Both of such reports are hereby incorporated by reference.

Typically, shot coke is formed in a delayed coker. In such coker, a suitable petroleum residuum is introduced into a closed vessel, and suitable temperature (usually in excess of 800 degrees F.) and pressure are maintained to decompose the residuum and/or drive off the volatile products. Usually, shot coke is formed from high sulfur, dense petroleum residuums. One theory of shot coke formation is that in the coking process, spherical nuclei of heavy aromatics and oxidized polar fractions form separate phases in a paraffinic matrix, sphere growth is enhanced by the turbulence of the process, and high-viscosity spheres are thermally condensed and precipitated. U.S. Pat. No. 3,960,704, which is hereby incorporated by reference, discloses that air blowing petroleum residuum will produce a coker feedstock suitable for producing shot coke.

After the shot coke is formed, it is calcined. The calcinization drives off water and volatile matter, including hydrogen, and converts the carbon to a more graphitic form. A typical process involves feeding green coke (i.e., uncalcined coke) into a refractory-lined rotary kiln calciner operated at temperatures of about 2000 to 2700 degrees F. Preferably, the calcinization should substantially remove any hydrogen present in the raw coke. Failure to remove the hydrogen would permit it to react with the chlorine present in the chlorination process, which would be a waste of chlorine values and create a waste disposal problem for the hydrogen chloride so formed. Preferably, the calcined coke should have a hydrogen content of less than about 0.5%, more preferably less than about 0.3% and most preferably less than about 0.1%.

Other typical properties of calcined shot coke are that it has (1) a Hardgrove Grindability Index (as determined by ASTM D 409) of less than about 40, (2) one or more substantially isotropic properties, and (3) a coefficient of thermal expansion of at least $20 \times 10^{-7}$ per degrees C. By the term "substantially isotropic property" is meant that the coke has substantially the same chemical or physical property in any direction. Also, the crystallinity of calcined shot coke is generally less than that of sponge or needle coke.

Fluid coke is generally formed in a continuous process in which a stream of fine coke particles, i.e., about 50-2,000 microns in size, is heated and introduced into a fluidized bed reactor. Residuum feedstock is continuously fed into the reactor where it coats the particles and rapidly undergoes thermal cracking. The volatiles so formed are removed, and successive layers of coke are built up on the particles as they are reheated and recoated with feedstock. The reaction temperature generally is about 850-1,000 degrees F. The raw coke so formed can be calcined in accordance with the process mentioned hereinabove.

The calcined, spherical coke utilized in this invention may contain sulfur. Typically, the sulfur content of the coke will be up to 8%. Typical ranges of sulfur content are about 0.05-6%, more typically about 1-5%, and most typically about 0.2-4%.

The particle size of the calcined, spherical coke utilized in this invention is about 50-10,000, preferably about 150-5,000, and most preferably about 425-3,000 microns in diameter.

If desired, the calcined, spherical coke utilized in this invention can be mixed with other commonly used cokes such as fuel or sponge coke.

While not wanting to be bound to any particular theory, it is believed that the attrition resistance of the calcined, spherical shot coke utilized in this invention is a combination of physical resistance to attrition and chemical resistance to attrition caused by the action of chlorine and oxygen on the coke.

The following examples illustrate, but do not limit, the concept of the present invention.

Example 1

TiO$_2$ Chlorination with Calcined Conoco Shot Coke in a Continuous Plant-Scale Reactor Titanium-containing ore, more than 90% by weight of which having a particle diameter between 75 and 300 microns was fed into a fluidized bed chlorination reactor at an average rate of about 45,000 pounds per hour. Petroleum shot coke, more than 90% by weight of which had a particle diameter of 425 microns to 10,000 microns was also fed into the reactor at an average rate of about 8,845 pounds per hour. The foregoing feed rates were after the reactor reached steady, stable conditions.

The foregoing coke was manufactured by Conoco Inc. in accordance with the following procedure: A high-sulfur petroleum residuum was fed to a conventional refinery delayed coker wherein the residuum was subjected to thermal cracking and condensing reactions, forming coke in the coke drums predominantly in the form commonly referred to as shot coke. The shot coke was further processed in a commercial rotary kiln calciner where the coke was devolatilized and the carbon converted to a more graphite form. Calciner conditions were controlled such that the volatile matter of the coke was reduced from about 10 wt. % to less than 1.0 wt. % and the real density (measured by kerosene displacement on a sample of $-200$ Tyler mesh particles) of the calcined coke was 1.97–2.01 g/cc.

The chlorinator reactor operated at a temperature of 1,000°–1,500° C., a superficial gas velocity of about 0.8 feet per second (which contained a stoichiometric amount of Cl$_2$, less than 10% O$_2$, and up to 25% N$_2$ and other inerts), a settled bed height of about 16 feet, and with essentially no unreacted Cl$_2$ in the chlorinator off-gas. The coke entrainment rate (i.e., the amount of coke entrained in the hot gases exiting the fluidized bed reactor) averaged about 1,402 pounds per hour (i.e., about 15.9 weight percent) with more than 90 weight percent of the entrained coke having a particle diameter range between 2.4 and 150 microns.

Example 2

TiO$_2$ Chlorination with Calcined Texaco Fluid Coke and with Calcined Conoco Shot Coke in a Continuous Reactor Coke Calcinations Several hundred grams of screened uncalcined Texaco fluid coke, particle diameter range 425 to 850 microns, were placed in an upright clear fused silica tube with a fritted disc and indirectly heated at 1000° C. for 2 hours in a N$_2$ purge gas stream to remove essentially all hydrogen contained in the green coke. The calcined coke contained less than 0.1% hydrogen and was screened again to remove minor amounts of off-size particles. This procedure was repeated for several hundred grams of uncalcined Conoco shot coke.

Continuous Chlorination Apparatus

The continuous fluidized bed chlorinator is made of clear fused silica and is externally heated to 1,000° C. with a platinum-wound resistance furnace. Premixed ore and coke are fed through a screen feeder from a hopper using a digital read-out load cell to monitor the feed. The fluidized bed is about 48 mm in diameter, with a single conical orifice located at the bottom of the chlorinator. A mixture of Cl$_2$ and He is fed through the orifice so that a superficial gas velocity of about 0.25 foot per second is maintained above the orifice. The reaction chamber is connected to a cyclone (located inside the heated furnace section and above the fluidized bed), and hot entrained solids are discharged from the bottom of the cyclone into a receiver located below the furnace.

The collected entrained solids are taken from the receiver at certain time intervals and are weighed before and after ashing to determine the coke content. Additional $Cl_2$ and He is added to the cyclone inlet to convert ferrous chloride into ferric chloride and to increase the gas velocity inside the cyclone. Chlorination products are separated by fractionally condensing iron chloride and other high-boiling metal chlorides above 200° C. and by condensing most $TiCl_4$ gas as a liquid at about 0° C. Residual $FeCl_3$ was removed from the $TiCl_4$ stream by contacting heated NaCl pellets to form liquid $NaCl/FeCl_3$ eutectic. Liquid $TiCl_4$ product was collected in a graduated tube and weighed. $Cl_2$ in the off-gas is analyzed at the end of the chlorination period after all ore and coke was fed into the reactor, by passing through a KI solution. Off-gas samples are periodically taken and analyzed by infrared absorption for their $CO/CO_2$ content. Bed fluidization is monitored with a pressure transducer connected to the bed via a wall tap near the base of the bed.

TiO$_2$ Chlorination with Calcined Texaco Fluid Coke

Run A: A homogeneous blend of (a) 662.4 g rutile concentrate (available from Associated Minerals Consolidated, Ltd. and having approximately 92 weight percent $TiO_2$), more than 90 weight percent of which has a particle diameter between 75 and 300 microns, and (b) 165.6 g calcined Texaco fluid coke with a particle diameter between 425 and 850 microns is placed in the feed hopper of the described chlorination apparatus. After heating the chlorination apparatus to 1,000° C., it is charged with 150 g of the above blend. While additional rutile/coke blend is fed at a rate of about 2 grams per minute until the feed hopper content is depleted, the reaction mixture is fluidized and reacted with a gas mixture of 868 cc/min. $Cl_2$ and 1476 cc/minute He for a total of 327 minutes. Entrained solids (i.e., solids entrained in the gases exiting the bed) were collected during the reaction period from 180 and 270 minutes and from 270 to 327 minutes after initiating the chlorination reaction. The collected entrained solids were not contaminated by water-soluble metal chlorides and were weighed before and after calcination in a muffle furnace at 900° C. overnight.

The results were as follows:

| Sample No. | Entrained Solids Collection Period | Total Weight of Entrained Solids (gms) | Coke Content In Entrained Solids (Weight Percent) |
|---|---|---|---|
| 1 | 90 min. starting at 180 min. after initiation of reaction | 4.45 | 0.67 |
| 2 | 57 min. starting at 270 min. after initiation of reaction | 3.48 | 1.00 |

The $TiCl_4$ product weighed 884 g. There was no significant concentration of unreacted $Cl_2$ in the off-gas after all ore and coke were fed into the chlorinator. The $CO/CO_2$ ratio in the off-gas varied from 0.75 to 0.84.

TiO$_2$ Chlorinations with Calcined Conoco Shot Coke

Run B: The first test was carried out with a homogeneous blend of 720 g of the rutile concentrate mentioned in Run A of this example and 180 g calcined Conoco shot coke (prepared in accordance with the general procedure mentioned in Example 1) having a particle diameter of 425 to 850 microns. Again, 150 grams of the blend was initially placed in the heated reactor at 1000° C. While additional rutile/coke blend is fed at a rate of about 2 grams per minute, the reaction mixture is fluidized with a mixture of 868 cc/minutes $Cl_2$ and 1476 cc/minutes He for a total of 355 minutes. The weight of entrained solids samples and their coke content is as follows:

| Sample No. | Entrained Solids Collection Period | Total Weight of Entrained Solids (gms) | Coke Content In Entrained Solids (Weight Percent) |
|---|---|---|---|
| 1 | 90 min. starting at 180 min. after initiation of reaction | 4.70 | 0.61 |
| 2 | 85 min. starting at 270 min. after initiation of reaction. | 6.68 | 1.65 |

The $TiCl_4$ product weighed 979 g. There was no significant concentration of unreacted $Cl_2$ in the off-gas after the ore/coke blend was fed into the chlorinator. The $CO/CO_2$ ratio in the off-gas varied from 0.67 to 0.88.

Run C:

The rutile concentrate/Conoco shot coke blend of Run B was substantially repeated except that an additional 27 grams coke was added to compensate for coke combustion by the $O_2$ added to the reaction gas. Specifically, 150 grams of the rutile/coke blend was placed in the 1000° C. hot reactor and a feed rate of about 2.1 grams/minute of the blend was maintained while fluidizing and reacting with a mixture of 868 cc/minute $Cl_2$, 1476 cc/minute He and 87 cc/minute $O_2$. The chlorination was terminated after the rutile/coke blend in the feed hopper was depleted after 365 minutes. A sample of entrained solids was collected for 95 minutes starting 270 minutes after initiation of $Cl_2$ feed. It weighed 7.75 grams and contained 0.98 weight percent coke. $TiCl_4$ product weighed 819 grams. There was no unreacted $Cl_2$ in the off-gas after depleting the rutile/coke mixture from the feed hopper and before terminating the gas flow. The $CO/CO_2$ ratio in the off-gas varied from 1.06 to 1.29.

The invention claimed is:

1. In a fluidized bed process for chlorinating titanium-containing material, the improvement comprising utilizing in the process calcined petroleum shot coke, calcined petroleum fluid coke or mixtures thereof, said improved process being capable of (a) decreasing the mount of fine particulate coke that is entrained in the hot gases exiting the fluidized bed reactor, and (b) more completely reacting the coke.

2. The process of claim 1 wherein the coke has a coefficient of thermal expansion of greater than about $20 \times 10^{-7}$ per degree Centigrade.

3. The process of claim 1 in which the coke has a Hardgrove Grindability index of 40 or less.

4. The process of claim 1 in which the coke has one or more substantially isotropic properties.

5. The process of claim 1 in which the coke has an average particle size of about 50–10,000 microns.

6. The process of claim 1 wherein the titanium-containing material is titanium-containing ore, beneficiates of titanium-containing ore, titanium-containing by-products or slags or mixtures thereof.

7. The process of any one of the proceeding claims 1–6 wherein the coke has a sulfur content of up to about 8%.

8. The process of claim 1 in which the coke is shot coke having:
 (a) a Hardgrove Grindability Index of less than 40,
 (b) one or more substantially isotropic properties,
 (c) a coefficient of thermal expansion of at least $20 \times 10^{-7}$ degrees C., and, 9. The process of any one of claims 1–6 wherein the coke has a hydrogen content of less than about 0.5 percent.

10. The process of claim 1 wherein calcined petroleum shot coke is utilized.

11. The process of claim 1 wherein calcined petroleum fluid coke is utilized.

* * * * *